(12) United States Patent
Rhee et al.

(10) Patent No.: US 8,204,049 B2
(45) Date of Patent: Jun. 19, 2012

(54) ADD-DROP BENES NETWORKS

(75) Inventors: June Koo Rhee, Daejeon (KR); Chan Kyun Lee, Daejeon (KR)

(73) Assignee: Korea Advanced Institute of Science and Technology (KR)

( * ) Notice: Subject to any disclaimer, the term of this patent is extended or adjusted under 35 U.S.C. 154(b) by 269 days.

(21) Appl. No.: 12/686,099

(22) Filed: Jan. 12, 2010

(65) Prior Publication Data

US 2011/0103798 A1 May 5, 2011

(30) Foreign Application Priority Data

Nov. 5, 2009 (KR) .................. 10-2009-0106396

(51) Int. Cl.
*H04L 12/50* (2006.01)
(52) U.S. Cl. ..................... 370/380; 370/280
(58) Field of Classification Search .............. None
See application file for complete search history.

(56) References Cited

U.S. PATENT DOCUMENTS

| | | | |
|---|---|---|---|
| 5,940,389 A * | 8/1999 | Yang et al. | 370/380 |
| 6,243,361 B1 * | 6/2001 | McMillen et al. | 370/254 |
| 6,363,183 B1 * | 3/2002 | Koh | 385/19 |
| 6,973,032 B1 * | 12/2005 | Casley et al. | 370/230 |
| 2005/0141804 A1 * | 6/2005 | Yang et al. | 385/17 |
| 2011/0103798 A1 * | 5/2011 | Rhee et al. | 398/83 |

* cited by examiner

*Primary Examiner* — Robert Wilson
(74) *Attorney, Agent, or Firm* — Cantor Colburn LLP

(57) ABSTRACT

Benes networks include an input stage having a plurality of input ports, an input connection stage configured to connect output signals of the input stage, an add connection stage configured to connect outputs of the input connection stage and to connect inputs of add ports corresponding in number to the number of the plurality of input ports, a drop connection stage configured to connect outputs of the add connection stage, to output some outputs to a next stage, and to output some outputs to drop ports, an output connection stage configured to connect the some outputs of the drop connection stage to an output side, and an output stage configured to output the outputs of the output connection stage to output ports.

8 Claims, 9 Drawing Sheets

FIG.4

| | NUMBER OF ELEMENTS (2×2 SWITCHES) |
|---|---|
| BENES NETWORKS (N) | $N(\log_2 N - 1/2)$ |
| ADD-DROP BENES NETWORKS (2N) | $2N(\log_2 2N - 1/2)$ |
| ADD-DROP BENES NETWORKS (SUGGESTED) | $N(\log_2 N + 1)$ |

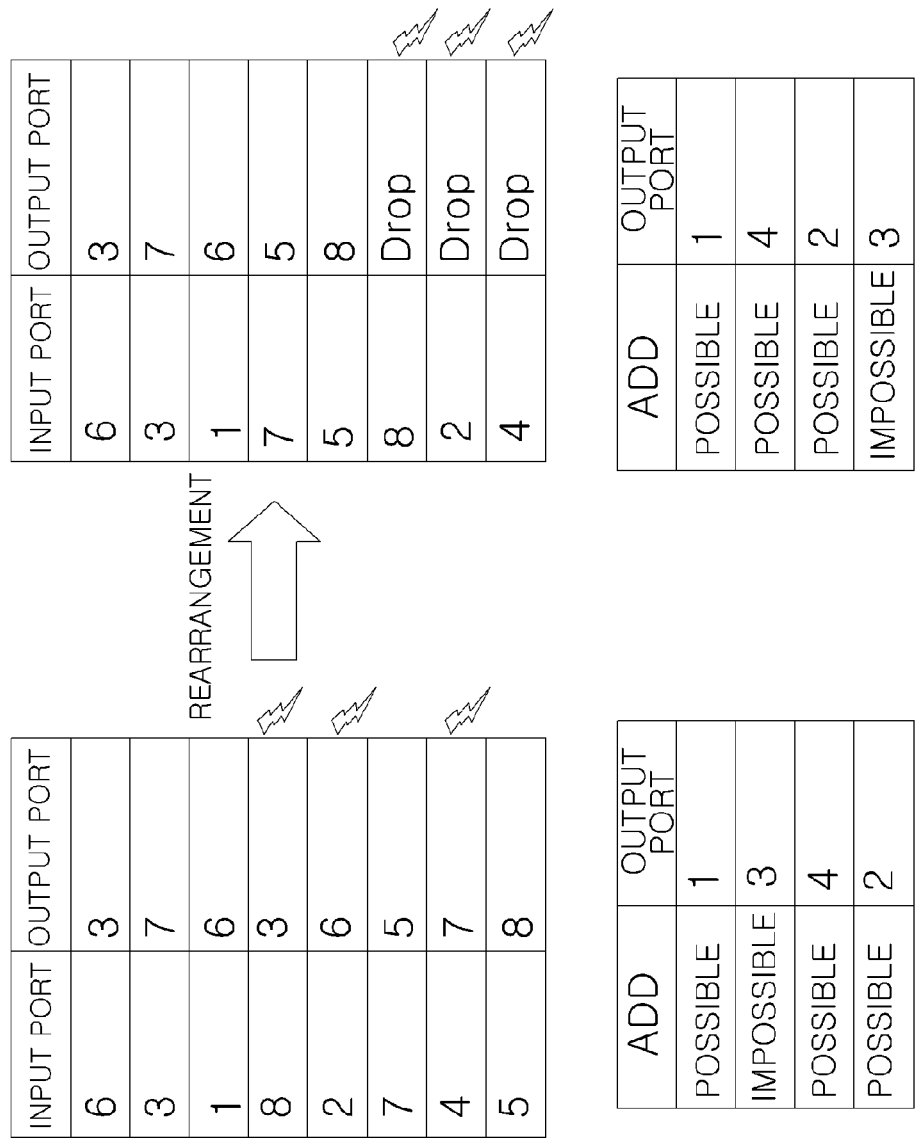

ADD-DROP BENES NETWORKS

BACKGROUND OF THE INVENTION

1. Field of the Invention

The present invention relates to Benes networks having an add-drop function, and more particularly to add-drop Benes networks capable of minimizing network complexity by adding a minimum number of additional elements to the existing Benes networks, which are a representative example of rearrangeably nonblocking networks and performing an add-drop function using a simple algorithm.

2. Description of the Related Art

Research into a space-division switching technology has been widely conducted not only in a network field and but also in the natural world. In a space-division switching network, an input-output pair is connected through a physical path, and different inputs and outputs are connected through different physical paths. The space-division switching network is divided into a partial connection network, a full connection network, a rearrangeably nonblocking network and a strictly nonblocking switching network according to input-output connection performance.

In particular, the rearrangeably nonblocking network is characterized in that, when a new input-output pair is connected, a predetermined switching network connection state is changed, and network elements, such as 2×2 switches, less in number than the number of network elements of the strictly nonblocking network are necessary.

The Benes networks are a representative example of rearrangeably nonblocking networks, and research into a network architecture and a driving algorithm thereof has been actively conducted.

FIG. 1 is a diagram showing the configuration of the existing 8×8 Benes networks. The Benes networks are a representative example of the rearrangeably nonblocking switching networks, and are characterized in that various physical paths from one input port to one output port are formed and an internal path of the existing switching network is rearranged when a physical connection of a new idle input-output pair within the network is determined. The Benes networks are composed of a combination of 2×2 switches. When the number of input/output ports is N, the whole networks are composed of 2 log$_2$ N−1 stages and each stage is composed of N/2 2×2 switches. That is, N×N Benes networks having N inputs/outputs are composed of a total of $$N\left(\log_2 N - \frac{1}{2}\right) 2 \times 2$$

switches.

In a looping algorithm for driving the Benes networks, there is a limitation that different input ports based on a time slot always have different output ports as destinations. In addition, an add-drop function is required for expandability, maintenance and repair of the networks.

Add-drop Benes networks which were suggested in the related art in order to solve such problems are shown in FIG. 2.

The architecture of the add-drop Benes networks of the related art shown in FIG. 2 includes an input stage 110 having eight input ports, an output stage 120 having eight output ports, an add input stage 130 having eight add ports, a drop output stage 140 having eight drop ports, first and second input connection stages 151 and 152 composed of four 2×2 switches to connect the input stage 110 and the add input stage 130, first and second intermediate connection stages 171 and 172 for connecting the outputs of the first and second input connection stages 151 and 152, and first and second output connection stages 161 and 162 for selectively connecting the outputs of the first and second intermediate connection stages 171 and 172 to the output stage 120 and the drop output stage 140.

In the add-drop Benes networks of the related art having such an architecture, if N×N add-drop Benes networks are implemented using 2N×2N Benes networks, N input ports of the input/output ports of the 2N×2N Benes networks are used as the add ports and N output ports thereof are used as the drop ports so as to implement the N×N add-drop Benes networks having an add-drop function. Accordingly, many switches, that is, $$2N\left(\log_2 2N - \frac{1}{2}\right) 2 \times 2$$

switches are required.

SUMMARY OF THE INVENTION

Therefore, the present invention has been made in view of the above problems which occur in the existing add-drop Benes networks, and it is an object of the present invention to provide add-drop Benes networks capable of minimizing network complexity by adding a minimum number of additional elements and performing an add-drop function using a simple algorithm, in the implementation of the add-drop function for association with homogeneous and heterogeneous networks and systems.

It is another object of the present invention to provide add-drop Benes networks capable of providing a physical path for solving packet contention in which different input ports based on a time slot have the same output port as destinations, in an add-drop function and a network implementation algorithm.

It is another object of the present invention to provide add-drop Benes networks capable of improving efficiency in view of power and cost by providing an efficient physical path using a simple driving algorithm.

In accordance with an aspect of the present invention, the above and other objects can be accomplished by the provision of Benes networks including: an input stage having a plurality of input ports; an input connection stage configured to connect output signals of the input stage; an add connection stage configured to connect outputs of the input connection stage and to connect inputs of add ports corresponding in number to the number of the plurality of input ports; a drop connection stage configured to connect outputs of the add connection stage, to output some outputs to a next stage, and to output some outputs to drop ports; an output connection stage configured to connect the some outputs of the drop connection stage to an output side; and an output stage configured to output the outputs of the output connection stage to output ports.

The Benes networks may further include a switch controller configured to process time slot-based packets, to control physical connections of input-output pairs, and to perform an add function from the add ports and an add-drop looping algorithm for transmitting contention packets or loss packets to the drop ports.

The add-drop looping algorithm may extract packets to be dropped from the packets input during a time slot so as to arrange the packets in a last portion thereof, perform connection between inputs and outputs, which are not dropped, using the existing looping algorithm, and process packets to be added after processing the packets to be transmitted to the drop ports.

According to the present invention, it is possible to provide flexible networks with high expandability through association with homogeneous and heterogeneous systems such as networks, other switches and buffers, by adding an add-drop function which is variously applied.

In addition, it is possible to minimize additional logic circuits and elements necessary for implementing the add-drop function and to implement efficient networks in view of power and cost by using a simple driving algorithm.

BRIEF DESCRIPTION OF THE DRAWINGS

The above and other objects, features and other advantages of the present invention will be more clearly understood from the following detailed description taken in conjunction with the accompanying drawings, in which:

FIG. 4 is a diagram showing comparison between the number of elements of the existing Benes networks and the number of elements of the add-drop Benes networks according to the present invention;

FIGS. 5A to 5D are diagrams illustrating a driving algorithm of the add-drop Benes networks according to the present invention.

DETAILED DESCRIPTION OF THE INVENTION

Hereinafter, exemplary embodiments of the present invention will be described with respect to the accompanying drawings. In describing the present invention, if it is determined that the detailed description of a related known function or construction renders the scope of the present invention unnecessarily ambiguous, the detailed description thereof will be omitted.

Figure 1:
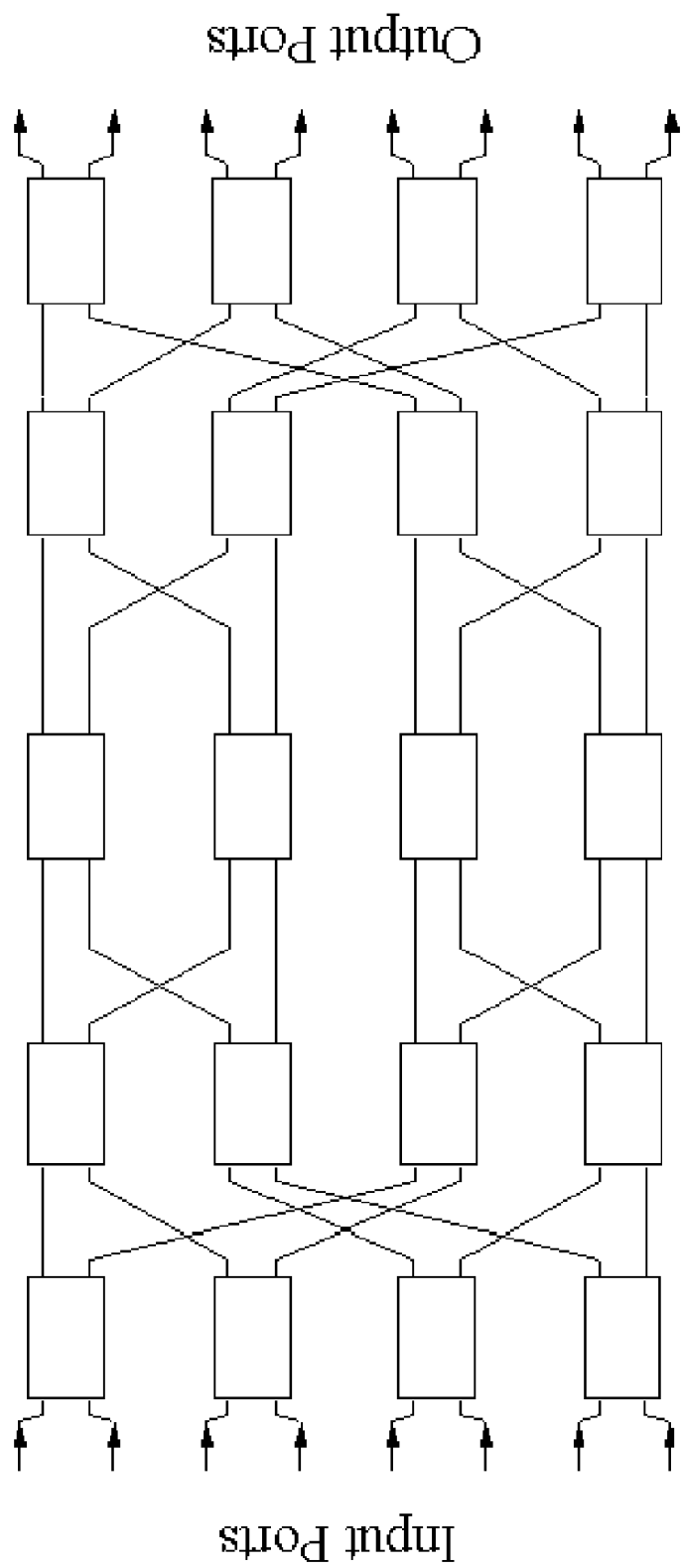
FIG. 1 is a diagram showing an architecture of the existing Benes networks.
Figure 2:
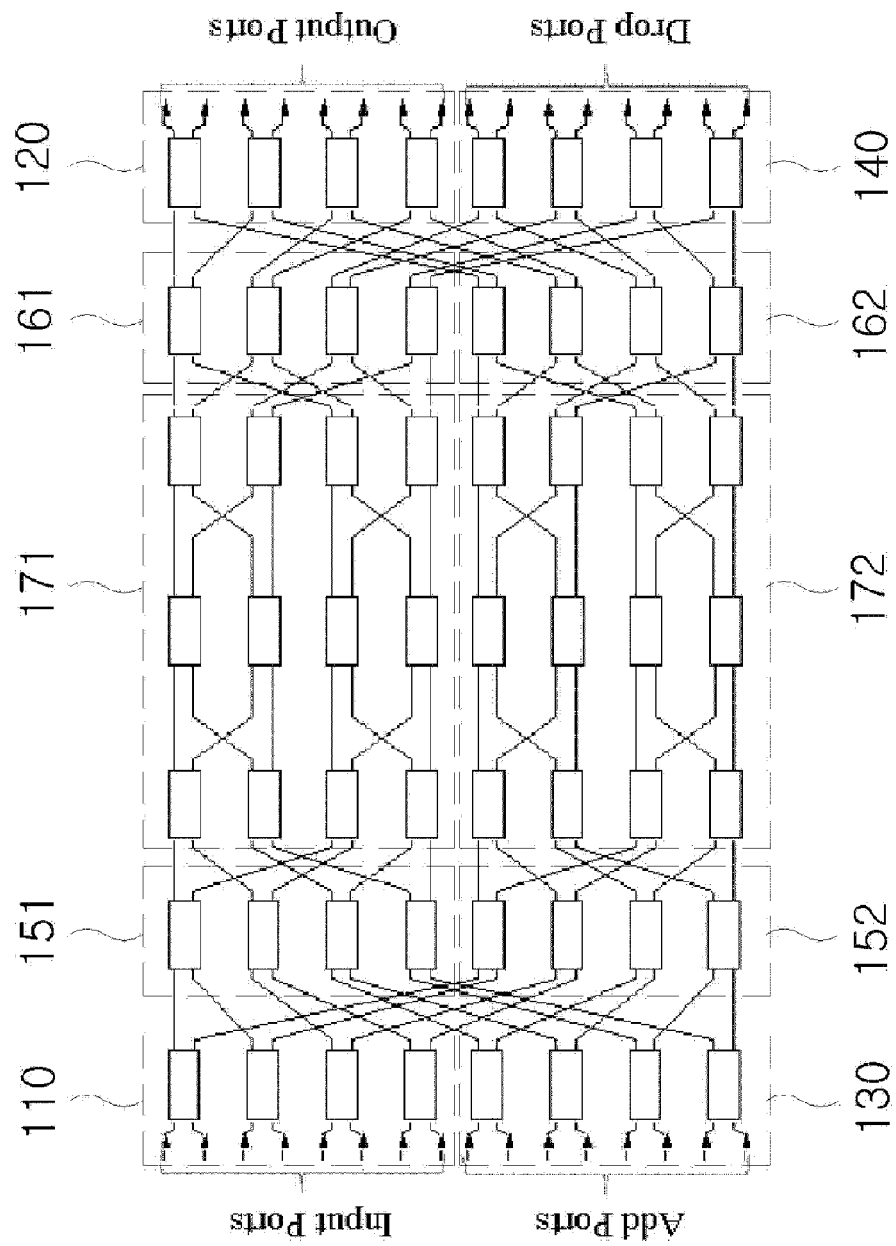
FIG. 2 is a diagram showing an architecture of add-drop Benes networks of the related art.
Figure 3:
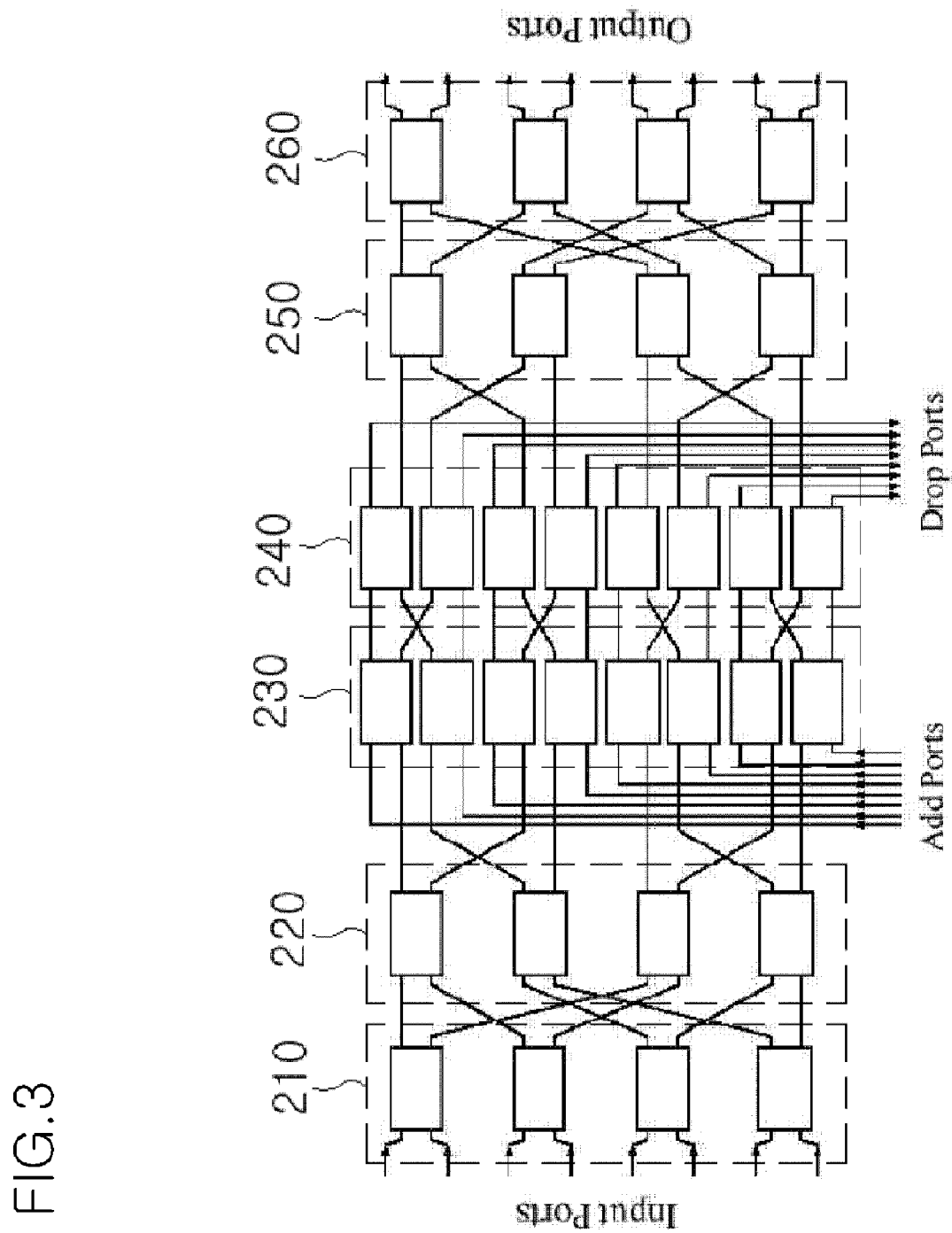
FIG. 3 is a diagram showing an architecture of add-drop Benes networks according to the present invention.

FIG. 3 is a diagram showing an architecture of 8×8 add-drop Benes networks according to the present invention. The architecture of the add-drop Benes networks includes an input stage 210 having eight input ports, an input connection stage 220 for connecting output signals of the input stage 210, an add connection stage 230 for connecting the input connection stage and connecting the inputs of the eight add ports, a drop connection stage 240 for connecting the outputs of the add connection stage 230, outputting some outputs to a next stage, and outputting some outputs to drop ports, an output connection stage 250 for connecting some outputs of the drop connection stage 240 to an output side, and an output stage 260 for outputting the outputs of the output connection stage 250 to output ports.

In the 8×8 add-drop Benes networks having such an architecture, 2×2 switches located at an intermediate stage of the 8×8 add-drop Benes networks are replaced with four 2×2 switches. Since the replaced four 2×2 switches are connected to the switches of other stages and are connected to other add-drop ports, 8×8 Benes networks, in which a total of eight add-drop ports is included, are implemented in view of the overall network.

The present invention is not limited thereto and is applicable to N×N Benes networks. In the implementation of the add-drop function of the N×N Benes networks, the number of 2×2 switches of the intermediate stages is increased to four. Accordingly, in the method of implementing the N×N add-drop Benes networks, a total of $N(\log_2 N+1)$ 2×2 switches is required.

A table for comparing the number of 2×2 switches necessary for the existing N×N Benes networks, the number of 2×2 switches necessary when using 2N×2N Benes networks in order to implement N×N Benes networks, and the number of 2×2 switches necessary for N×N add-drop Benes networks using the method suggested by the present invention is shown in FIG. 4.

In the Benes networks, with respect to time slot-based packets in which different input ports have different output ports as the destinations, physical connections of all input-output pairs can be performed using a looping algorithm.

In the add-drop Benes networks of the present invention, when an add-drop function is implemented by a relatively small number of 2×2 switches, the ratio of 2×2 switches per port is smaller than that of the existing Benes networks and thus a degree of freedom for the physical connection between the ports is decreased. Accordingly, an algorithm for the add-drop Benes networks and an add-drop looping algorithm require an additional limitation, as compared with the looping algorithm used in the existing Benes networks.

The add-drop looping algorithm processes the time slot-based packets, and requires an add function from the add ports and a function for transmitting contention packets or loss packets to drop ports in addition to the physical connection of the input-output pairs. The add-drop looping algorithm extracts packets to be dropped from the packets input during the time slot and arranges the packets in a last portion thereof. After the connection between the inputs and the outputs, which are not dropped, is performed using the existing looping algorithm, packets to be transmitted to the drop ports are processed by checking the states of the switches of the intermediate stage. When the number of packets to be dropped is n, n switches of 2×2 switches of a $\log_2$ N-th stage are in an idle state and one of two switches of a $(\log_2 N+1)$-th stage connected thereto is also in an idle state. After the packets to be dropped arrive at the 2×2 switches of the $\log_2$ N-th stage in the idle state, the current switch state is determined so as to be connected to the 2×2 switches, which are not in the idle state, of the switches of the $(\log_2 N+1)$-th stage. Since the connection state is determined in advance such that the 2×2 switches which are not in the idle state are connected to the output ports, the packets which arrive at the $(\log_2 N+1)$-th stage through the above process are dropped. If all the switches of the $(\log_2 N+1)$-th stage connected to the 2×2 switches of the $\log_2$ N-th stage in the idle state are in the idle state, the states of the 2×2 switches of the $\log_2$ N-th stage are determined to arrive at any of the 2×2 switches. The current switch states of the switches of the $(\log_2 N+1)$-th stage, the subsequent states of which have not been determined, are determined such that the input packets are dropped.

The add function may be performed before the packets to be dropped are processed. However, in the present invention, the add function has been performed after the drop function, for simplicity. If the output ports which are the destinations of the packets to be added are occupied by the connection of the input and output packets, which is performed in advance, the packets are not added and wait for a next time slot. If the output ports of the packets to be added are not occupied by other packets, the packets may be added. At this time, an algorithm for determining the add ports is necessary. The packets to be added should necessarily pass through the switches in the idle state out of the 2×2 switches of the ($\log_2$ N+1)-th stage. Due to the characteristics of the architecture of the add-drop Benes networks, the 2×2 switches of the ($\log_2$ N+1)-th stage are not connected to all the output ports, odd-numbered 2×2 switches from the top in the ($\log_2$ N+1)-th stage are connected to first to N/2-th output ports, and even-numbered 2×2 switches are connected to (N/2+1)-th to N-th output ports. Accordingly, the packets to be added are added to the adequate add ports according to the numbers of the output ports which are the destinations of the packets to be added. At this time, in a state in which it is determined whether or not the 2×2 switches of the ($\log_2$ N+1)-th stage of the add-drop Benes networks are in the idle state, if the output ports of the add packets are between 1 and N/2, any one of the odd-numbered switches of the switches in the idle state of the ($\log_2$ N+1)-th stage is arbitrarily selected and any one of the 2×2 switches of the $\log_2$ N-th stage connected to the 2×2 switches in the idle state of the ($\log_2$ N+1)-th stage is arbitrarily selected so as to select the add ports connected thereto. If the output ports of the add packets are between N/2+1 to N, any one of the even-numbered switches of the switches in the idle state of the ($\log_2$ N+1)-th stage is arbitrarily selected and any one of the 2×2 switches of the $\log_2$ N-th stage connected to the 2×2 switches in the idle state of the ($\log_2$ N+1)-th stage is arbitrarily selected so as to select the add ports connected thereto. The connection of the input-output pairs in the add-drop Benes Networks, the drop function and the add function may be performed by the add-drop looping algorithm process, without causing a problem.

An example of the time slot-based input-output pair of the 8×8 add-drop Benes networks is shown in FIG. 5A. Here, the numbers of the input ports and the output ports denote the numbers of the 2×2 switches. In the input stage 210 of FIG. 3, an upper input port of an uppermost 2×2 switch has a number 1 and a lower input port thereof has a number 2. In the output stage 260, an upper output port of an uppermost 2×2 switch has a number 1 and a lower output port thereof has a number 2.

When the packets in one time slot have properties of the input/output ports of (6->3), (3->7), (1->6), (8->3), (2->6), (7->5), (4->7) and (5->8), since the output port having the number 3 is occupied by the (6->3) packet, the (8->3) packet is dropped. Similarly, the (2->6) and (4->7) packets are dropped and the algorithm rearranges the packets to be dropped. In the add function, when the packets having the output ports having the numbers 1, 2, 3 and 4 as the destinations are added, since the output port having the number 3 is occupied by the (6->3) input-output pair in advance, the packet having the output port having a number 3 cannot be added and waits for a next time slot, and only the packets having the output ports having the numbers 1, 2 and 4 are added. The add-drop looping algorithm is used for the add-drop function and the connection of input-output packets in the time slot shown in FIG. 5A, and the processes thereof in the 8×8 add-drop Benes networks are shown in FIGS. 5B, 5C and 5D.

Figure 5B:
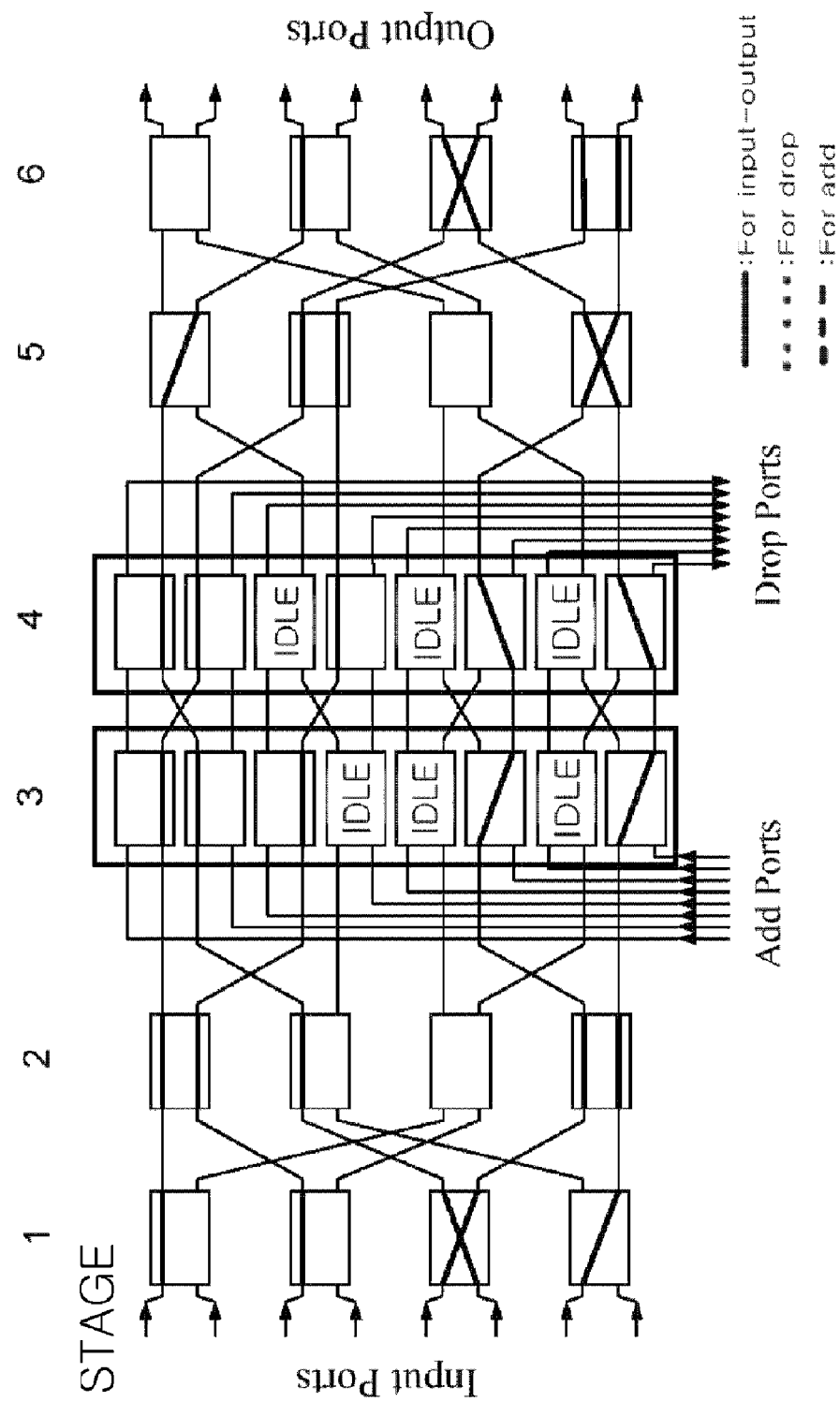

An example of the input-output connection of the add-drop looping algorithm in the 8×8 add-drop Benes networks is shown in FIG. 5B. On the basis of the rearranged packets, packets which are not dropped, that is, (6->3), (3->7), (1->6), (7->5) and (5->8), are connected using the looping algorithm.

Figure 5C:
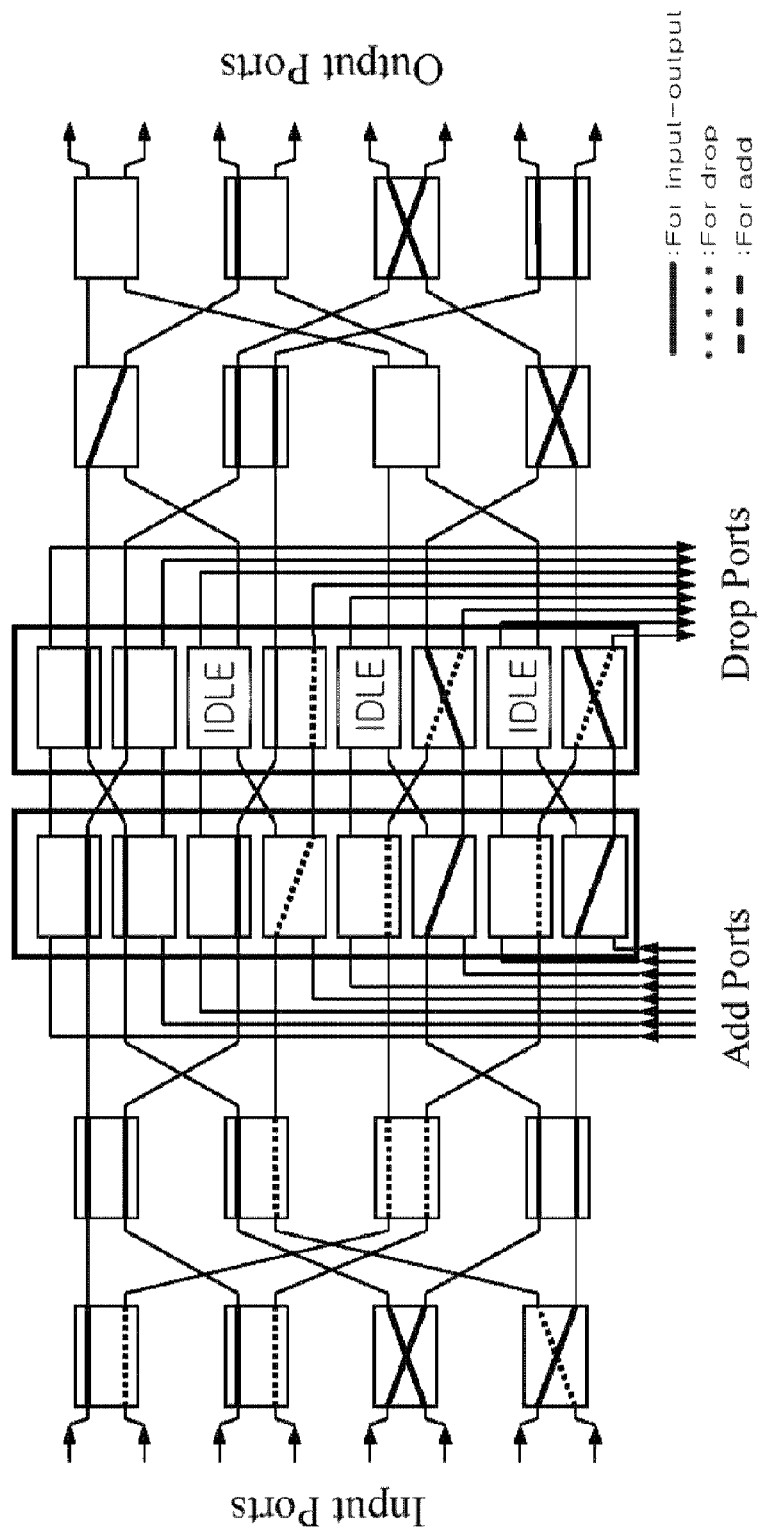

An example of the drop function of the add-drop looping algorithm in the 8×8 add-drop Benes networks is shown in FIG. 5C. In order to drop the packets to be dropped, that is, (8->3), (2->6) and (4->7), the states of the switches are determined such that the packets arrive at the switches in the idle state of the 2×2 switches in the $\log_2$ N-th stage and the current switch states of the $\log_2$ N-th stage are determined so as to be connected to the switches, which are not in the idle state, of the 2×2 switches of the ($\log_2$ N+1)-th stage. Since the input ports are connected to the output ports in advance, the newly input packets to the switches which are not in the idle state are connected to the drop ports.

Figure 5D:
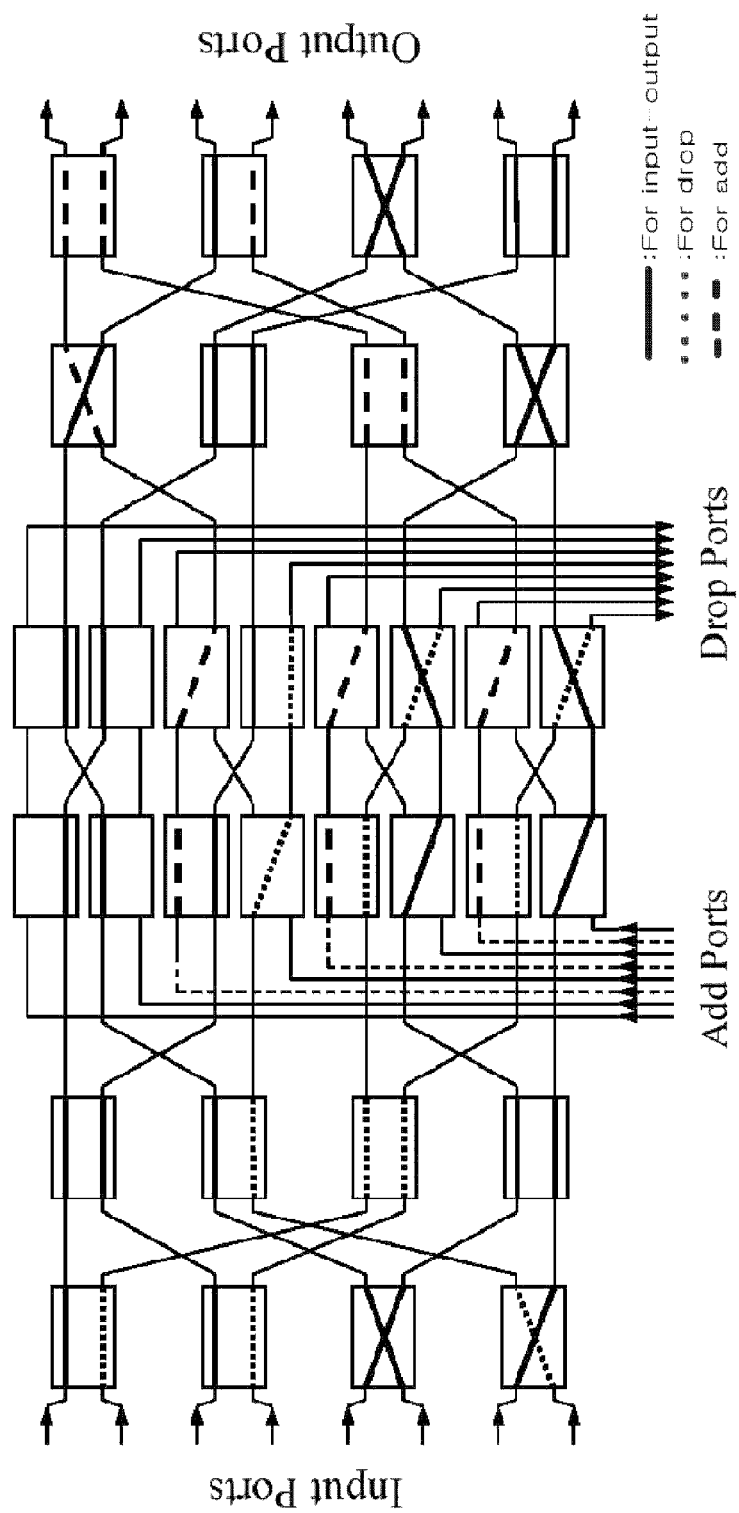

An example of the add function of the add-drop looping algorithm of the 8×8 add-drop Benes networks is shown in FIG. 5D. For the add function, the packet having the output port of the number 3 as the destination out of the standby packets cannot be added in this time slot, because the output port 3 is occupied in advance. Only the packets having the output ports of the numbers 1, 2 and 4 can be added in this time slot. Since the numbers of all the output ports are equal to or less than 4, the add function is performed through the odd-numbered switches, that is, the third, fifth and seventh switches out of the 2×2 switches in the idle state in the fourth stage. Since the third switch of the four stage is connected to the third and fourth switches of the third stage, the packets to be added through the third switch of the fourth stage use the add port connected to the third or fourth switch of the third stage. Similarly, the packets to be added using the fifth switch of the fourth stage use the add port connected to the fifth or sixth switch of the third stage, and the packets to be added using the seventh switch of the fourth stage use the add port connected to the seventh or eighth switch of the third stage. In FIG. 5D, the add packets having the output port having the number 1 are added through the third switch of the third stage and the third switch of the fourth stage, the add packets having the output port having the number of 2 are added through the fifth switch of the third stage and the fifth switch of the fourth stage, and the add packets having the output port having the number of 4 are added using the seventh switch of the third stage and the seventh switch of the fourth stage. Accordingly, it can be seen that the add-drop looping algorithm is operated in the add-drop Benes network without causing a problem.

Figure 6:
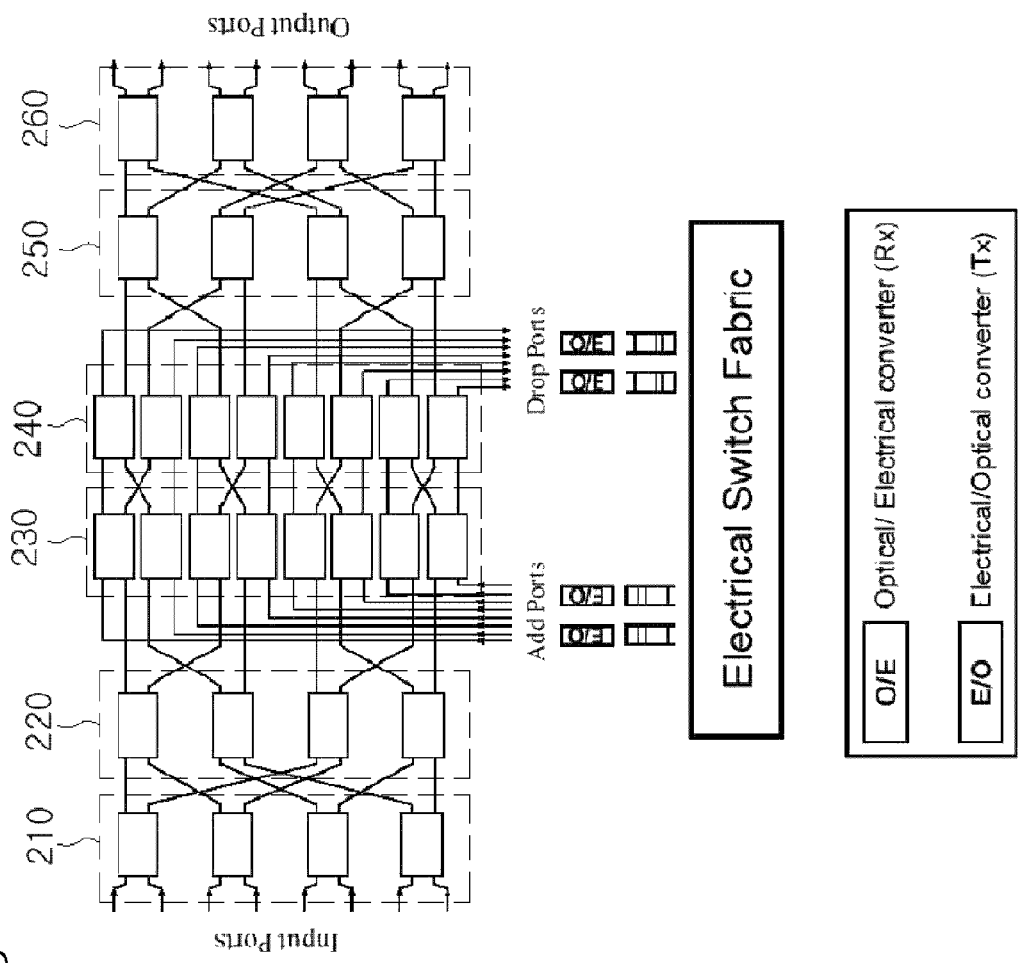
FIG. 6 is a diagram showing an architecture of an application of Benes networks, in which an add-drop function is implemented, in the present invention.

An example of an application of the add-drop Benes networks having the add-drop function is shown in FIG. 6. However, the present invention is not limited thereto and is applicable to all the cases in which the add-drop function is necessary. In the present embodiment, the application of the add-drop Benes networks for controlling the packets due to contention and loss in the networks, which includes add-drop Benes networks, an optical/electrical converter, an electrical/optical converter, an electrical buffer and an electrical switch, is shown. If packets of different input ports have the same output port as the destinations during the same time slot, since only one of the packets can arrive at the output port, it is determined that contention between the packets occurs. The packet which cannot arrive at the output port due to the contention should be controlled in the Benes networks. In the add-drop Benes networks, the contention packet is sent to the drop port, is subjected to optical/electrical conversion, and is buffered by the electrical buffer. After buffering, the packet is allocated to the electrical buffer again by the electrical switch, is buffered until the output port which is the destination of the original packet enters the idle state, is subjected to the electrical/optical conversion when the output port enters the idle state, is added by the add port, and is sent to the original destination.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. Benes networks having an add-drop function, the Benes networks comprising:
   an input stage having a plurality of input ports;
   an input connection stage configured to receive output signals of the input stage;
   an add connection stage configured to receive outputs of the input connection stage and to receive inputs from add ports corresponding in number to the number of the plurality of input ports;
   a drop connection stage configured to connect a portion of outputs of the add connection stage to an output connection stage and to connect remaining outputs of the add connection stage to drop ports;
   the output connection stage configured to connect a portion of outputs of the drop connection stage to an output stage; and
   the output stage configured to output outputs of the output connection stage to output ports.

2. The Benes networks according to claim 1, wherein the add connection stage includes a plurality of 2×2 switches configured to connect packets input through the input stage and to connect packets input through the add ports, and the number of switches configuring the add connection stage is twice the number of switches configuring the input stage.

3. The Benes networks according to claim 1, wherein the drop connection stage includes a plurality of 2×2 switches configured to connect packets output through the output stage and to connect packets dropped through the drop ports, and the number of switches configuring the drop connection stage is twice the number of switches configuring the output stage.

4. The Benes networks according to claim 1, further comprising a switch controller configured to process time slot-based packets, to control physical connections of input-output pairs, and to perform an add-drop looping algorithm for switch connection to provide an add function or a drop function at the add ports or the drop ports.

5. The Benes networks according to claim 4, wherein the add-drop looping algorithm arranges packets inputted during a time slot in order of precedence, in which packets to be outputted to the output ports through the output connection stage and the output stage are first arranged and packets to be dropped to the drop ports through the drop connection stage are arranged latest.

6. The Benes networks according to claim 5, wherein the add-drop looping algorithm performs to connect between inputs inputted from the add connection stage and outputs outputted to the output ports through the output connection stage and the output stage.

7. The Benes networks according to claim 6, wherein the add-drop looping algorithm processes packets to be dropped to the drop ports at the drop connection stage after connecting between the inputs inputted from the add connection stage and the outputs outputted to the output ports through the output connection stage and the output stage.

8. The Benes networks according to claim 7, wherein the add-drop looping algorithm processes packets to be added to the output ports through the output connection stage and the output stage after processing the packets to be dropped to the drop ports at the drop connection stage, allows processing of the packets to be added to wait for a next time slot if output ports which are destinations of the packets to be added are occupied by the connection between input and output packets, and processes packets to be added by using an algorithm for determining add ports if the output ports which are destinations of the packets to be added are not occupied by other packets.

* * * * *